Nov. 6, 1962　　　H. S. MIKA ETAL　　　3,062,058
AUTOMATIC BALANCE-INDICATING APPARATUS
Filed July 10, 1958　　　　　　　　　　　　　　　13 Sheets-Sheet 1

INVENTORS
HENRY S. MIKA
ELWOOD A. STIEGLER
NORMAN T. KEHOE
HUGH C. MEHLENBACHER
BY
Charles A. Blank
ATTORNEY.

Nov. 6, 1962 H. S. MIKA ETAL 3,062,058
AUTOMATIC BALANCE-INDICATING APPARATUS
Filed July 10, 1958 13 Sheets-Sheet 3
*Fig. 3*
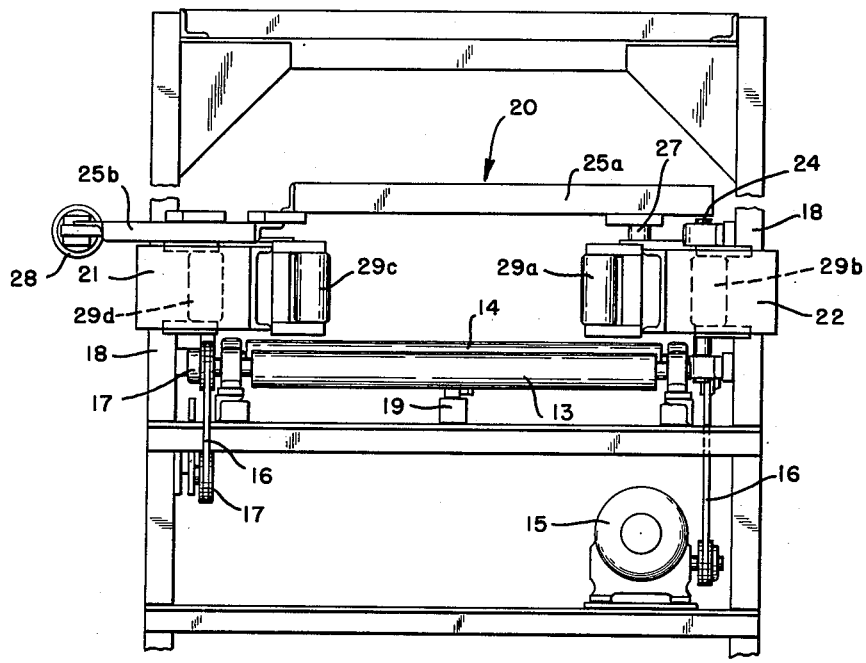
*Fig. 6*
*Fig. 5a*
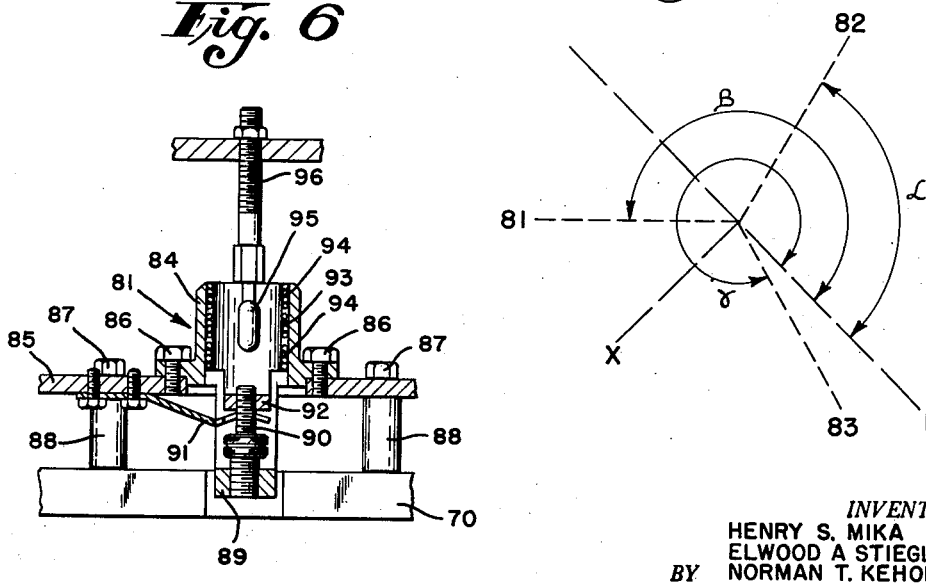
INVENTORS
HENRY S. MIKA
ELWOOD A STIEGLER
BY NORMAN T. KEHOE
HUGH C. MEHLENBACHER
Charles O. Black
ATTORNEY.

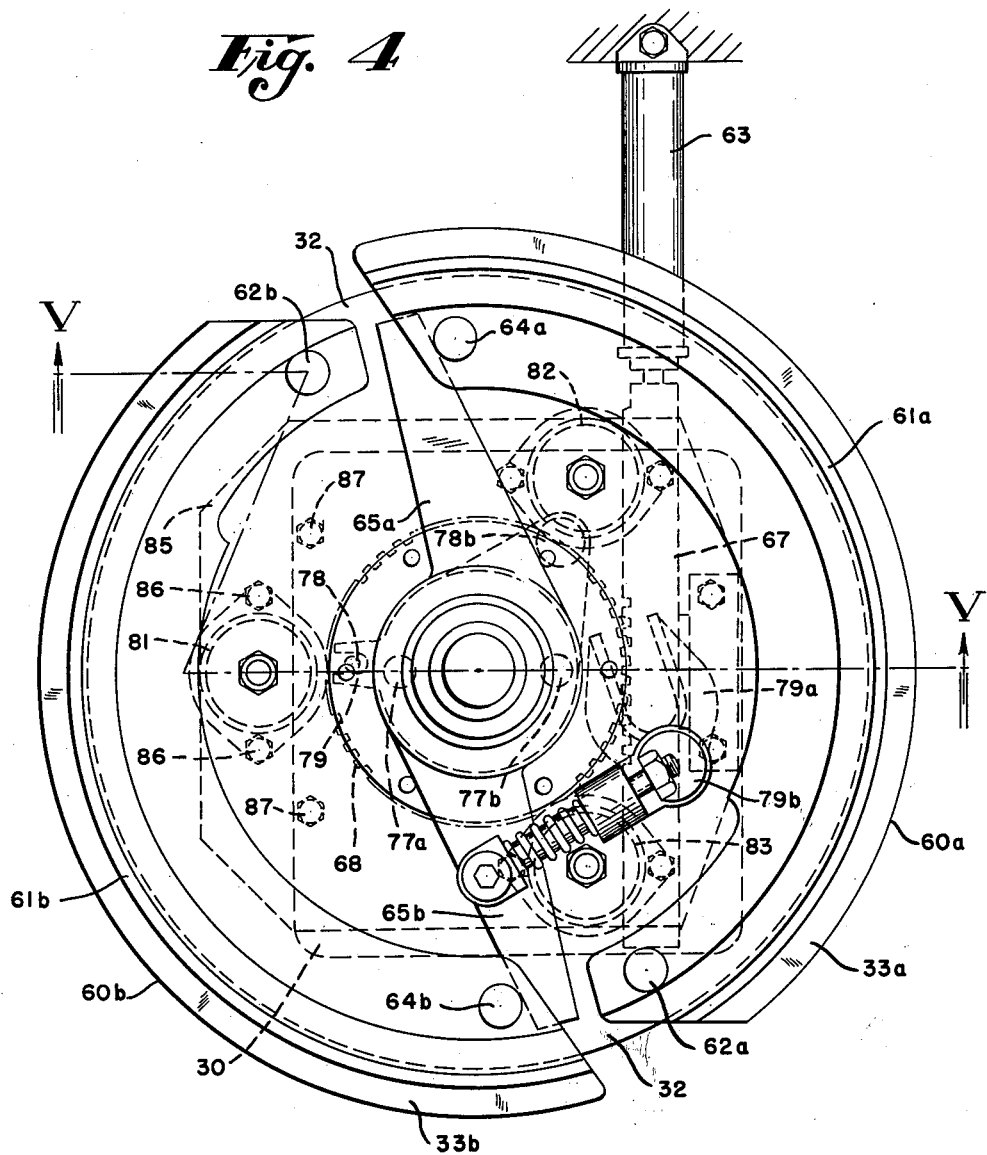

Nov. 6, 1962

H. S. MIKA ETAL 3,062,058

AUTOMATIC BALANCE-INDICATING APPARATUS

Filed July 10, 1958

INVENTORS
HENRY S. MIKA
ELWOOD A. STIEGLER
BY NORMAN T. KEHOE
HUGH C. MEHLENBACHER

Charles A. Blank
ATTORNEY.

Nov. 6, 1962  H. S. MIKA ETAL  3,062,058
AUTOMATIC BALANCE-INDICATING APPARATUS
Filed July 10, 1958  13 Sheets-Sheet 6

INVENTORS
HENRY S. MIKA
ELWOOD A. STIEGLER
BY NORMAN T. KEHOE
HUGH C. MEHLENBACHER

Charles A. Blank
ATTORNEY.

Nov. 6, 1962       H. S. MIKA ET AL       3,062,058

AUTOMATIC BALANCE-INDICATING APPARATUS

Filed July 10, 1958       13 Sheets-Sheet 7

INVENTORS
HENRY S. MIKA
ELWOOD A. STIEGLER
BY   NORMAN T. KEHOE
HUGH C. MEHLENBACHER

Charles A. Black

ATTORNEY.

Nov. 6, 1962    H. S. MIKA ETAL    3,062,058
AUTOMATIC BALANCE-INDICATING APPARATUS
Filed July 10, 1958    13 Sheets-Sheet 9

INVENTORS
HENRY S. MIKA
ELWOOD A. STIEGLER
BY  NORMAN T. KEHOE
HUGH C. MEHLENBACHER

Charles A. Blank
ATTORNEY.

INVENTORS
HENRY S. MIKA
ELWOOD A. STIEGLER
NORMAN T. KEHOE
HUGH C. MEHLENBACHER
BY
Charles A. Blank
ATTORNEY.

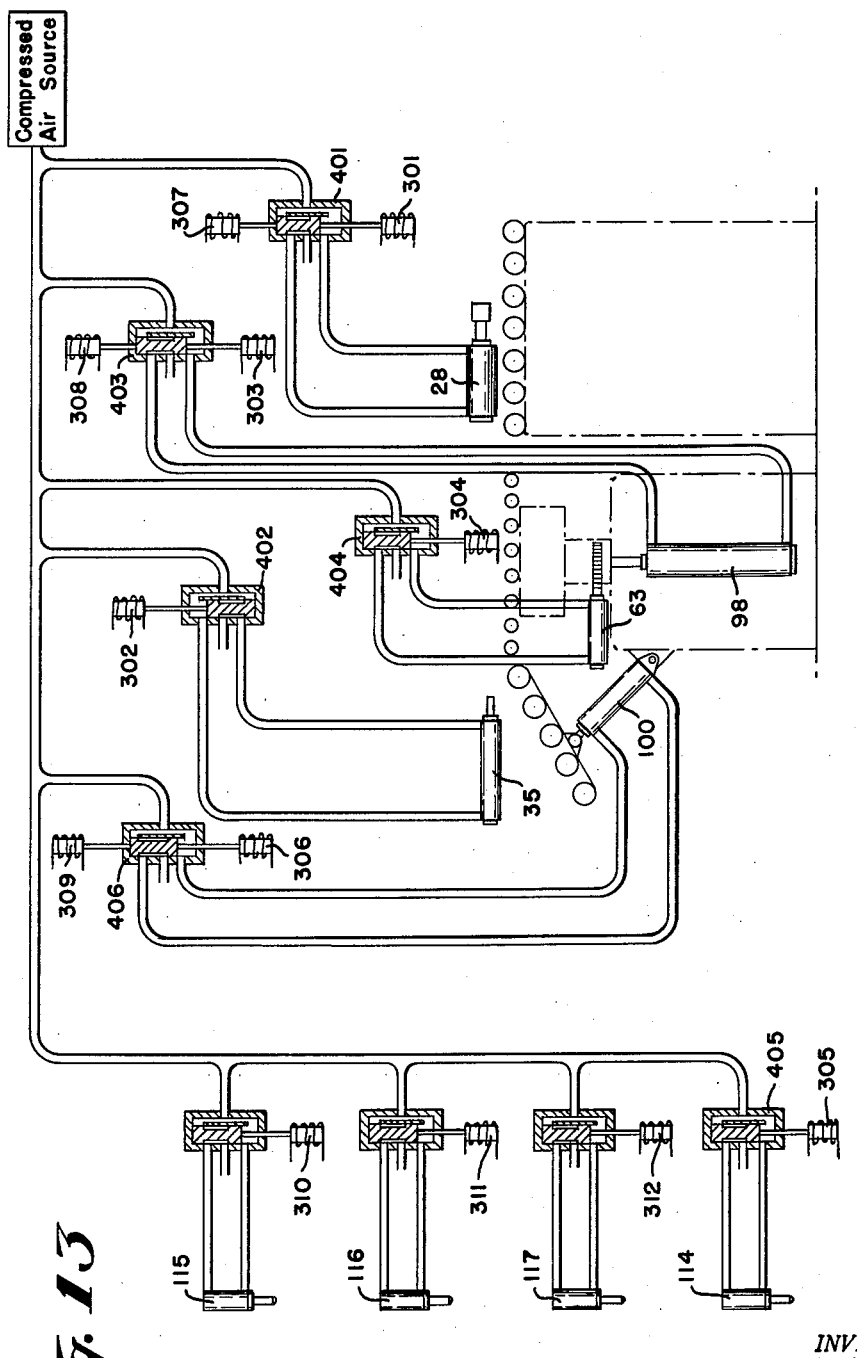

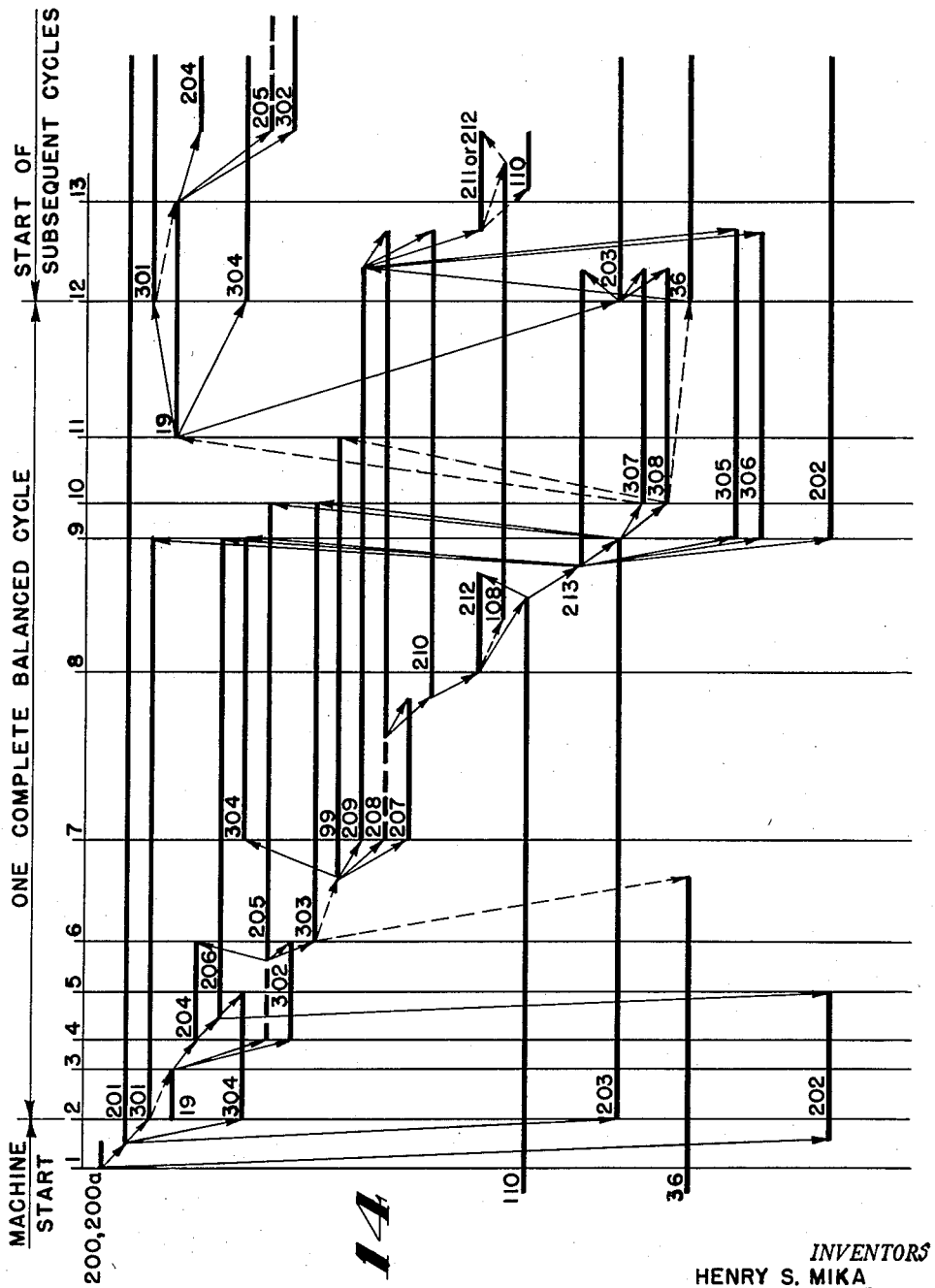

United States Patent Office  
3,062,058  
Patented Nov. 6, 1962

3,062,058
AUTOMATIC BALANCE-INDICATING APPARATUS
Henry S. Mika, Birmingham, Elwood A. Stiegler, Grosse Pointe Park, Norman T. Kehoe, Detroit, and Hugh C. Mehlenbacher, Bloomfield Hills, Mich., assignors to United States Rubber Company, New York, N.Y., a corporation of New Jersey
Filed July 10, 1958, Ser. No. 747,686
2 Claims. (Cl. 73—485)

This invention relates to apparatus for automatically indicating the condition of balance of an object. More particularly, the invention relates to apparatus of the type which is capable of automatically indicating the position and magnitude of any unbalance of a tire.

Apparatus of this type is described and claimed in an application Serial No. 747,741 of Henry S. Mika entitled "Apparatus for Developing a Signal Representing the Condition of Balance of an Object," filed concurrently herewith. The present invention is directed to certain features of such apparatus.

It is an object of the invention to provide a new and improved apparatus for automatically indicating the condition of balance of a tire in which both the position of any unbalance and its magnitude are indicated and in which susceptibility to error is minimized.

In accordance with the invention, apparatus for automatically indicating the condition of balance of an object comprises normally balanced means for supporting an object thereon and capable of assuming a stationary position of unbalance representative of any unbalance of the object. The apparatus also includes means attached to the supporting means at spaced points thereof and responsive to any stationary unbalance of the supporting means for individually developing signals representative of the displacement of the supporting means at the spaced points in response to any unbalance of the object. The apparatus also includes means for combining the aforesaid signals to develop a resultant signal uniquely representative of any unbalance of the object. The apparatus also includes means displaceable to the point of unbalance in response to the resultant signal for marking the point of unbalance. The apparatus also includes means for preventing the marking operation of the marking means in response to the balance condition of the normally balanced means before the normally balanced means assumes the stationary position of unbalance.

For a better understanding of the present invention together with other and further objects thereof, reference is had to the following description taken in connection with the accompanying drawings and its scope will be pointed out in the appended claims.

Referring now to the drawings:

FIG. 3 is a fragmentary elevational view of the intake or feeder portion of the FIG. 2 apparatus taken along line III—III of FIG. 2;

FIG. 4 is a plan view, to an expanded scale, of a portion of the apparatus of FIG. 1 taken along line IV—IV of FIG. 1;

FIG. 5 is an enlarged sectional view of a portion of the FIG. 1 apparatus taken along line V—V of FIG. 4 with the chuck partially expanded and a tire mounted thereon;

FIG. 5a is a vector diagram to aid in explaining the operation of the FIG. 1 apparatus;

FIG. 6 is a sectional view of a differential transformer taken on line VI—VI of FIG. 5;

FIG. 13 is a diagrammatic view of the valve and piping system of the apparatus;

FIG. 14 is a diagram representing the sequence of operations of the FIG.1 apparatus when a tested tire is balanced.

Figure 1:
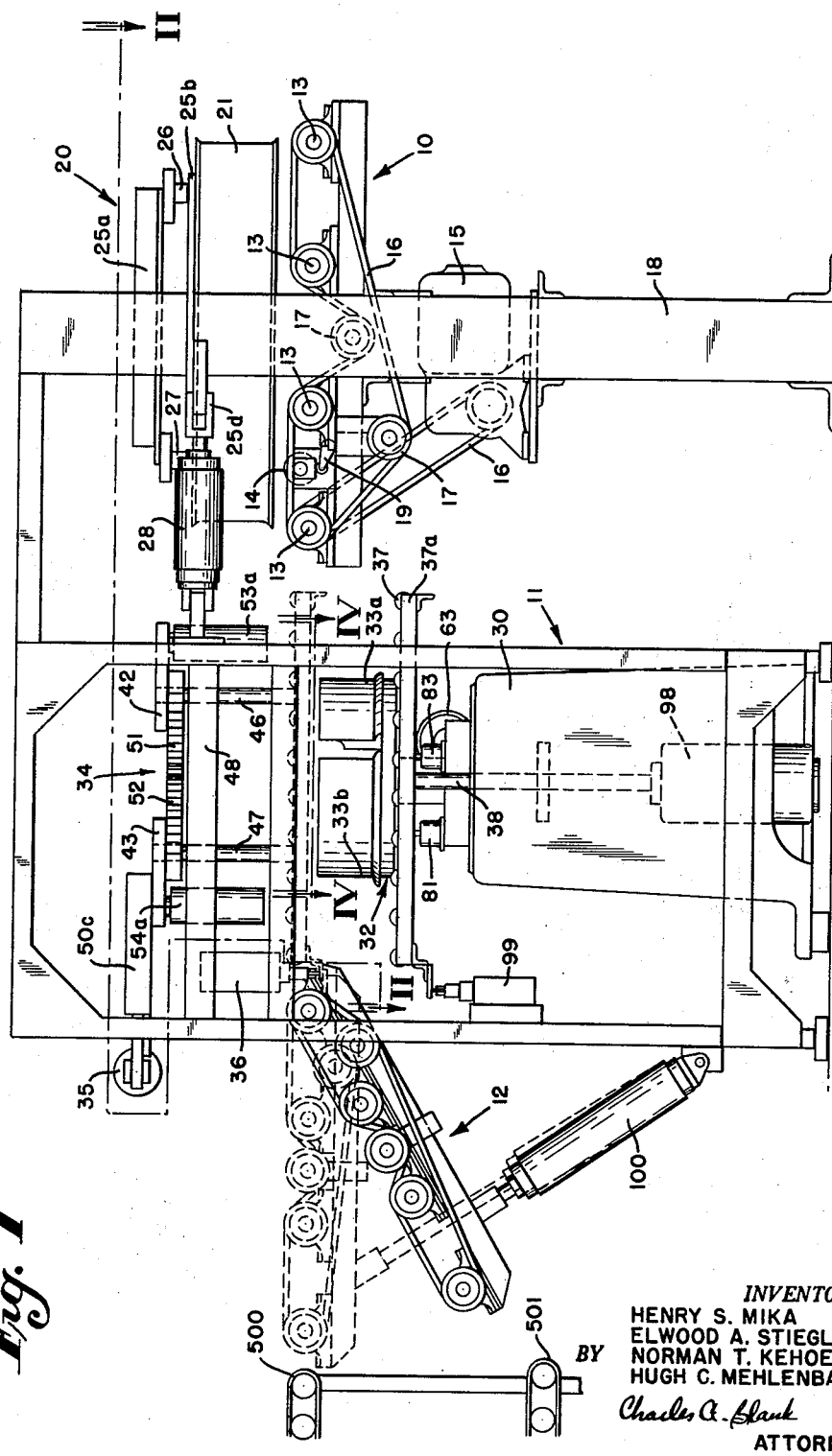
FIG. 1 is a fragmentary side elevational view, partly diagrammatic, of automatic tire-balance indicating apparatus constructed in accordance with the invention, omitting marking apparatus, pneumatic and electrical control systems.

Referring now more particularly to FIG. 1 of the drawings, there is represented in fragmentary side elevational view, partly diagrammatic, apparatus for automatical'y indicating the condition of balance of a tire. The FIG. 1 view of the apparatus is complete with the exception that certain marking apparatus, electrical circuits, motor drives and a solenoid control valve and piping system, more fully described hereinafter with reference to FIGS. 7-13, inclusive, have been omitted from FIG. 1 for the sake of clarity. The FIG. 1 apparatus comprises an intake or feeder portion 10, a balance-indicating portion 11 and a sorter mechanism 12.

The feeder portion 10 comprises means for conveying tires to the apparatus, in particular, a horizontal conveyor system having active rolls 13, 13 driven by a suitable motor 15 through a belt and pulley system 16, 17. A vertically displaceable idler roll 14 is provided for control purposes described hereinafter. A suitable frame 18 supports the motor and conveyor system. A limit switch 19 is mounted for actuation by idler roll 14. The feeder portion 10 of the FIG. 1 apparatus also includes means for accepting a single tire into the apparatus including electromechanical means responsive to the position of tires along the conveying means for automatically controlling the operation of the tire-accepting means. More particularly, the single tire-accepting means comprises a mechanism 20 controlled by limit switch 19 which is actuated by idler roll 14.

The mechanism 20 may be more readily described with reference to FIG. 2 which is a fragmentary plan view, of the FIG. 1 apparatus taken along line II—II of FIG. 1 and with reference to FIG. 3, which is a view taken along line III—III of FIG. 2.

The mechanism 20 for accepting a single tire into the apparatus comprises a pair of arms 21, 22 pivotally mounted at points 23, 24, respectively, and linked together by an arm 25a having pivots at points 26, 27 and actuated by a pneumatic cylinder 28 through link arms 25b, 25c, 25d. The arms 21 and 22 have rolls 29a, 29b, 29c, 29d at the ends thereof for engaging the tread of a conveyed tire. The mechanism 20 is represented in its position corresponding to the actuated condition of cylinder 28.

Referring again to FIG. 1, the balance-indicating portion 11 of the apparatus includes normally balanced means having stationary and displaceable portions 30, 32, respectively, for supporting a tire thereon and capable of assuming a stationary position of unbalance representative of any unbalance of the tire. More particularly, there is provided a normally balanced table 32 having a chuck 33a, 33b thereon for gripping a tire and a stationary support comprising a base 30 therefor. The table 32 is supported at its center of gravity for supporting a tire with the geometrical center of the tire at the center of gravity of the table. By center of gravity of the table is meant the center of gravity of the table and appurtenances thereto, including chuck 33a, 33b.

In order to position the tire on the chuck 33a, 33b there is provided electromechanical means responsive to the position of the tire along the conveying system of the feeder portion 10. The electromechanical means just mentioned comprises a mechanism 34 for automatically centering the tire for disposition on the chuck 33a, 33b. The mechanism 34 is actuated by a pneumatic cylinder 35 which is, in turn, controlled by means of a limit switch 19 and a solenoid valve (not shown in FIG. 1), as will be explained subsequently. A table of idler rolls 37 is disposed, when positioned as represented in broken-line construction, to accept a tire from the conveyor rolls 13, 13 and in that position is in physical contact with a limit switch 36 for actuating the switch 36. The table of conveyor rolls 37 is supported by means of suitable shafts 38, 38 (only one of which is apparent in the drawing) for lowering the table 37 to the position 37a represented in solid-line construction for placing a tire on the chuck 33a, 33b.

The centering mechanism 34 may be more clearly described with reference to FIG. 2 of the drawings. The centering mechanism 34 comprises four arms 40, 41, 42, 43 pivotally mounted on pins 44, 45, 46, 47, respectively, attached to the supporting frame 48. Gears 49, 50, 51, 52 are attached to the arms 40, 41, 42, 43, respectively, for displacing the arms in response to actuation by cylinder 35 which is connected to arms 40 and 43 by means of links 50a, 50b, 50c. Suitable rollers 53, 54, 53a, 54a are mounted on arms 40, 41, 42, 43, respectively, for engagement with the tread of the tire. The centering mechanism is represented in its position corresponding to the actuated condition of cylinder 35.

Referring again to FIG. 1, the automatic tire-balance-indicating apparatus also includes electromechanical means attached to the supporting means at spaced points thereof corresponding to different regions of the tire and responsive to any stationary unbalance of the supporting means for individually developing signals representative of the displacement of the supporting means at the spaced points in response to any unbalance of the tire. More particularly, the electromechanical means just mentioned comprises means for supplying plural-phase alternating-current signals, preferably three phase signals. This supply means is not represented in FIG. 1 but is shown diagrammatically in FIG. 11, as will be described hereinafter. The electromechanical means also comprises displacement-measuring devices coupled to the supply means and attached to the supporting means at spaced points thereof corresponding to different circumferential regions of the tire.

Referring for the moment to FIG. 4, that figure is a plan view of a portion of the apparatus of FIG. 1 taken along the line IV—IV of FIG. 1 and representing the chuck 33a, 33b. As is apparent in FIG. 4, the chuck members 33a, 33b have a substantially circular outer edge with flanges 60a, 60b extending therefrom to engage the tire bead in cooperation with surfaces 61a, 61b of the chuck members 33a, 33b. Chuck members 33a and 33b, respectively, are pivotally mounted on pins 62a, 62b attached to balance table 32a. The chuck members 33a, 33b also have suitable pins 64a, 64b attached thereto for engagement with driving arms 65a, 65b mounted on central sleeves and post described more fully hereinafter with reference to FIG. 5. A suitable rack 67 engages a pinion gear 68 for driving the arms 65a, 65b in response to actuation by cylinder 63, as will be more fully described presently. There are also represented in FIG. 4 three differential transformers 81, 82, 83 more fully described subsequently.

Referring now to FIG. 5, which is a sectional view of the chuck 33a, 33b its drive mechanism and the differential transformers taken along line V—V of FIG. 4, the chuck elements 33a, 33b are represented in an expanded position supporting a tire 69. A base plate 70 is attached to the stationary support 30 represented in FIG. 1. A central post 66 attached to the base plate 70 passes through pinion 68 actuated by rack 67. A vertical length of flexible wire 71 serving as a universal pivot and represented in a relaxed condition (exaggerated in the drawing) is carried by the upper end of post 66. The lower end of the balance wire passes through a lug 72 of a hub 73 surrounding the post 66 and carrying the balance table 32. The hub 73 has sufficient annular clearance from the post 66 to allow tilting of the balance table.

The post 66 is fitted within a cylindrical sleeve 74 which in turn has a sleeve 75 slidably mounted thereon. The lower end of the sleeve 75 has a cam surface 76 for displacing the sleeve in response to cams 77a, 77b. Also, a pin 78 extends from the gear 68 to engage an extension 79 of a sleeve 80 rotatably mounted on the sleeve 75.

The electromechanical displacement-measuring devices previously mentioned comprise a plurality, preferably three, transformers having primary windings coupled to the alternating-current signal-supply means and having secondary windings. The transformers are individually responsive to alternating-current signals of different phases and are attached to the supporting means 30 at spaced points thereof corresponding to different regions of the tire for individually developing in the secondary windings signals representative of the displacement of the supporting means at the spaced points. More particularly, the transformers comprise differential transformers each having a primary winding and two secondary windings. Each transformer has its secondary windings connected in series opposition and the transformers individually have cores of ferromagnetic material movable relative to the windings. With reference to FIG. 5 of the drawings, one of the differential transformers 81 is shown in section in the drawing while a second differential transformer 82 is partially visible in the drawing. Referring for the moment to FIG. 4, three differential transformers 81, 82, 83 are represented in phantom to indicate that the transformers preferably are spaced at 120° intervals along the circumference of a circle.

Referring again to FIG. 5 and also to FIG. 6 which is a sectional view of the transformer 81 taken along line VI—VI, the differential transformer 81, which is also representative of the transformers 82 and 83, comprises a housing 84 attached to a plate 85 by means of suitable bolts 86, 86. The plate 85 is attached to the base by bolts 87, 87 and is supported by spacers 88, 88. A projecting tab 89 extends from the housing 84 and has a double-ended set screw 90 threaded therein for adjusting the distribution of the magnetic field within the differential transformer. A suitable flat spring 91 is attached to the plate 85 and presses against a cap 92 threaded on the screw 90 to assist in accurately positioning the cap 92 of the magnetic fields. The primary winding 93 and secondary windings 94, 94 are represented within the housing 84. A core 95 of suitable ferromagnetic material mounted on a shaft 96 bolted to the displaceable balance table is displaceable within the differential transformer to alter the magnetic-field distribution thereof.

From the foregoing description it will be seen that either the transformer windings or the cores, for example the windings, may be attached to the stationary portion of the supporting means. The cores are, for example, attached to the displaceable portion of the supporting means. Signals having magnitudes representative of the magnitude of the displacement of the supporting means at the spaced points and having phases representative of the sense of the displacement of the supporting means are developed at the spaced points. More particularly, the cores are attached to the balance table at the vertices of an imaginary equilateral triangle having its geometrical center coinciding with the center of gravity of the table. The developed signals are individually representative of the displacement of the table at the vertices of the triangle.

The apparatus also includes means for combining the signals developed in the differential transformers to develop a resultant signal uniquely representative of any unbalance of the tire. This combining means will be more fully described hereinafter.

Figure 7:
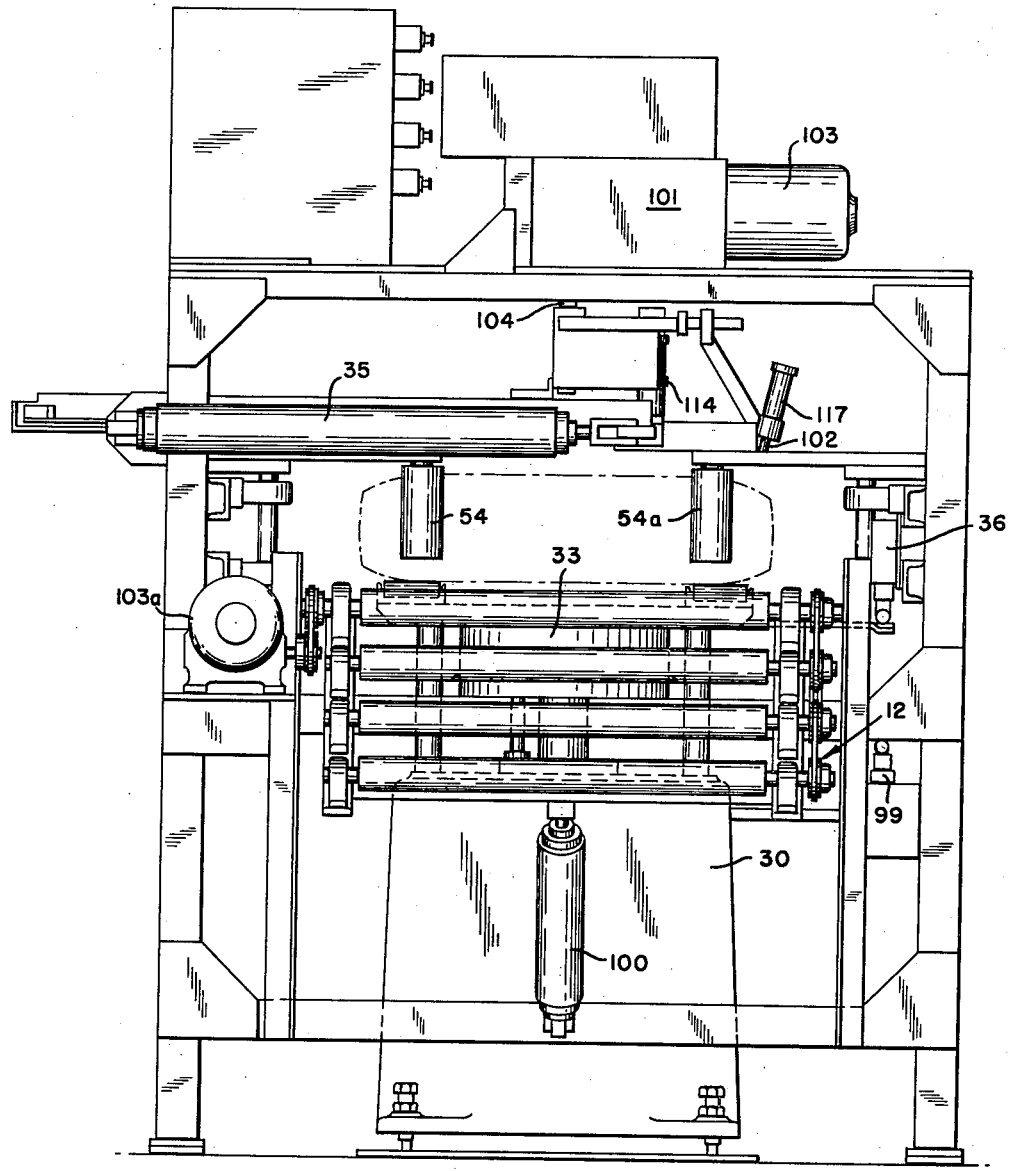
FIG. 7 is a rear elevational view, of the FIG. 1 apparatus representing the marking apparatus in part, but omitting pneumatic and electrical control systems.

Referring now more particularly to FIG. 7, which is a rear elevational view of the FIG. 1 apparatus, there is provided sorting means responsive to the amplitude of the resultant signal for rejecting an unacceptable tire. An unacceptable tire is one having an unbalance exceeding a predetermined maximum acceptable value of unbalance. The unacceptable tire must have its balance corrected before it will be acceptable. The sorting means comprises a displaceable mechanism 12, also represented in FIG. 1, actuated by a cylinder 100 under the control of a solenoid-operated valve more fully described hereinafter. The sorter mechanism 12 is represented in its reject position in FIG. 7 and in solid-line construction in FIG. 1 while it is represented in its accept position in broken-line construction in FIG. 1.

As is also apparent in FIG. 7, the apparatus includes means displaceable to the point of unbalance of the tire in response to the resultant signal for marking the point of unbalance. Either the effective point of maximum weight or the effective point of minimum weight may be marked as desired. More particularly, this means comprises a servo system 101 responsive to the phase of the resultant signal and marking instruments 102 attached to cylinders 114, 115, 116 and 117 which are responsive to the amplitude of the resultant signal. The servo system 101 is effective to displace the instruments to the point of unbalance for marking the tire at the point of unbalance in accordance with the amplitude of the resultant signal to indicate the magnitude of the unbalance.

Figure 8:
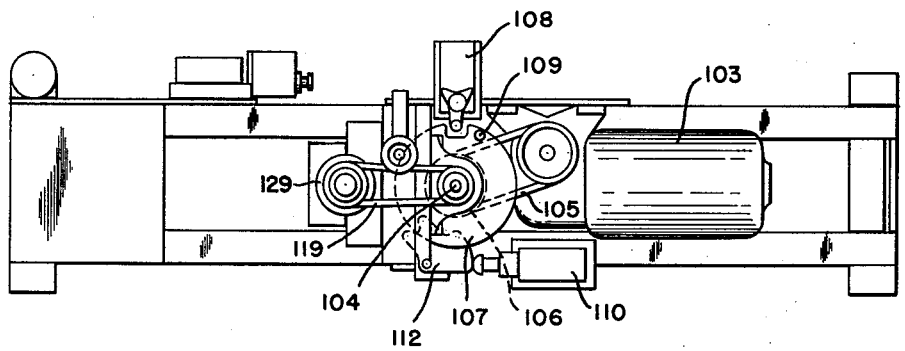
FIG. 8 is a plan view of mechanical elements of the apparatus for automatically marking the unbalance of the tire.
Figure 9:
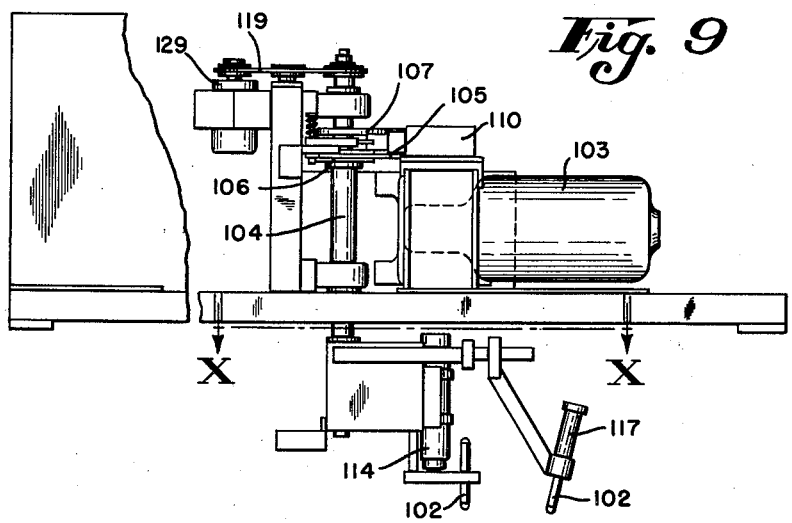
FIG. 9 is an elevational view of the FIG. 8 marking apparatus.

The mechanical features of the servo system and the marking instrument are more fully described in FIGS. 8, 9 and 10 and the electrical features of the servo system will be described hereinafter. Referring to FIGS. 8 and 9, motor 103 drives shaft 104 by means of belt and pulley 105, 106. A circular plate 107 is keyed to shaft 104 to actuate limit switch 108 upon rotation and to release over-travel limit switch 110, represented actuated, in response to the operation of pin 109 and cam 112 after 190 degrees of rotation of plate 107 from its reference position as represented in FIG. 8. A synchro transmitter 129 has a rotor 129b connected to shaft 104 by means of belt 119 and suitable pulleys to drive the marking devices to the point of unbalance in the direction of shortest travel thereto, as will be explained more fully hereinafter. The marking devices are actuated by cylinders 114, 115, 116, 117 represented in FIGS. 9 and 10.

Figure 11:
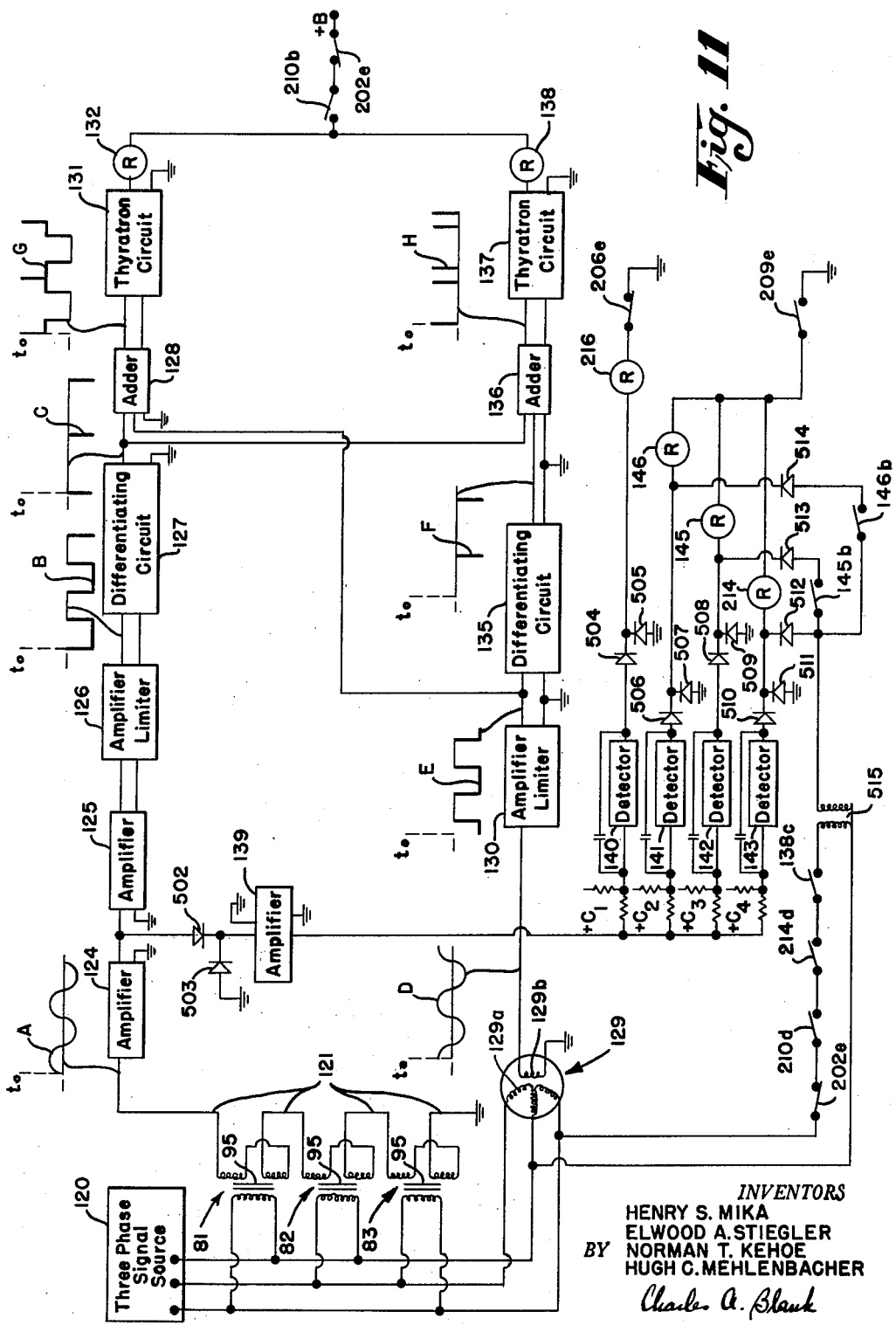
FIG. 11 is a schematic diagram of the servo system for positioning the marking apparatus.

Referring now more particularly to FIG. 11 of the drawings, there is represented a circuit diagram, partly schematic, of the means for combining the output signals of the differential transformers to provide a resultant signal representative of any unbalance of the tire. There are also represented circuits of the servo system for positioning the marking devices. More particularly, three-phase signal supply source 120 supplies signals of 120-degree phase spacing to the primary windings of differential transformers 81, 82, 83. The apparatus includes means intercoupling the secondary windings of the transformers for combining the signals to develop a resultant signal having a phase uniquely representative of the position of any unbalance of the tire and having an amplitude representative of the magnitude of the unbalance. This means comprises the connections 121 coupling the secondary windings in series. As previously mentioned, the two secondary windings within each transformer are connected in series in phase opposition. The connections 121 preferably connect the windings of the three transformers in series in the manner represented in FIG. 11.

The series-connected secondary windings are coupled through amplifiers 124 and 125 to the input circuit of an amplifier-limiter 126 comprising, for example, an amplifier biased to cut off and overdriven to saturation for deriving a rectangular-wave output signal. The output circuit of the amplifier 126 is coupled through a differentiating circuit 127 of conventional resistor-condenser construction to one input circuit of an adder 128 of conventional construction for a purpose described subsequently.

The three-phase signal source 120 is also connected to the stator windings 129a of a synchro transmitter 129 of conventional construction having its rotor 129b coupled to the input circuit of an amplifier-limiter 130 which may be of similar construction to the amplifier-limiter 126. The output circuit of the amplifier-limiter 130 is coupled to another input circuit of the adder 128 which combines the signal outputs of the differentiating circuit 127 and the amplifier-limiter 130 to derive a timing control signal for timing the firing of a Thyratron circuit 131 of conventional construction. The anode circuit of Thyratron circuit 131 is coupled to a relay 132 (hereinafter called a directional relay for reasons which will become apparent) for energizing the relay in response to the combination of signals derived from the secondary windings of the differential transformers and from the synchro transmitter. The energization of the Thyratron circuit 131 is also controlled by contacts 210b and 202e of relays 210 and 202 (FIGS. 12 and 12a) described hereinafter.

The output circuit of the amplifier-limiter 130 is also coupled through a differentiating circuit 135 of conventional resistor-condenser construction to an input circuit of an adder 136 having another input circuit coupled to the differentiating circuit 127 for combining the signal outputs of the differentiating circuits 127 and 135 to control the firing of a Thyratron circuit 137 coupled to the output circuit of adder 136. The firing of the Thyratron circuit 137 is also controlled by relay contacts 210b and 202e, in the anode circuit of the Thyratron circuit, for controlling the energization of a relay 138 (hereinafter called a coincidence relay for reasons which will become apparent). Relay 138 becomes energized when the output pulses of the differentiating circuits 127 and 135 are in time synchronism. The output circuit of amplifier 124 is coupled through a pair of rectifiers 502, 503 to a D.C. amplifier 139. The rectifiers 502 and 503 are associated with suitable time constant circuits in the input circuit of the amplifier 139 to drive a D.C. voltage representing the amplitude of the signal output of the amplifier 124. The output circuit of amplifier 139 is connected to the input circuits of unbalance detectors 140, 141, 142, 143. The detectors 140, 141, 142, 143 may, for example, be of a regenerative D.C. amplifier type represented in FIG. 5.29c of the text Electrical Analog Computers by Korn and Korn, McGraw Hill, 1952, with a suitable degenerative A.C. feedback resistor-condenser network connected from output to input circuits to eliminate transients.

The output circuit of detector 140 is coupled to rectifiers 504 and 505, relay winding 216, and relay contact 206e. The output circuit of detector 141 is coupled to rectifiers 506 and 507, relay winding 146 and relay contact 209e. The output circuit of detector 142 is coupled to rectifiers 508 and 509, relay winding 145 and relay contact 209e. The output circuit of detector 143 is coupled to rectifiers 510, 511, relay winding 214 and relay contact 209e. The purpose of relay windings 214, 145, 146 and 216 will be explained subsequently.

The primary winding of a transformer 515 is coupled through relay contacts 202e, 210d, 214d and 138c to one phase supply of the three phase source 120. The secondary winding of the transformer 515 is coupled to detector 141 through relay contact 146b and rectifier 514, to detector 142 through relay contact 145b and rectifier 513, and to detector 143 through rectifier 512.

Figure 12:
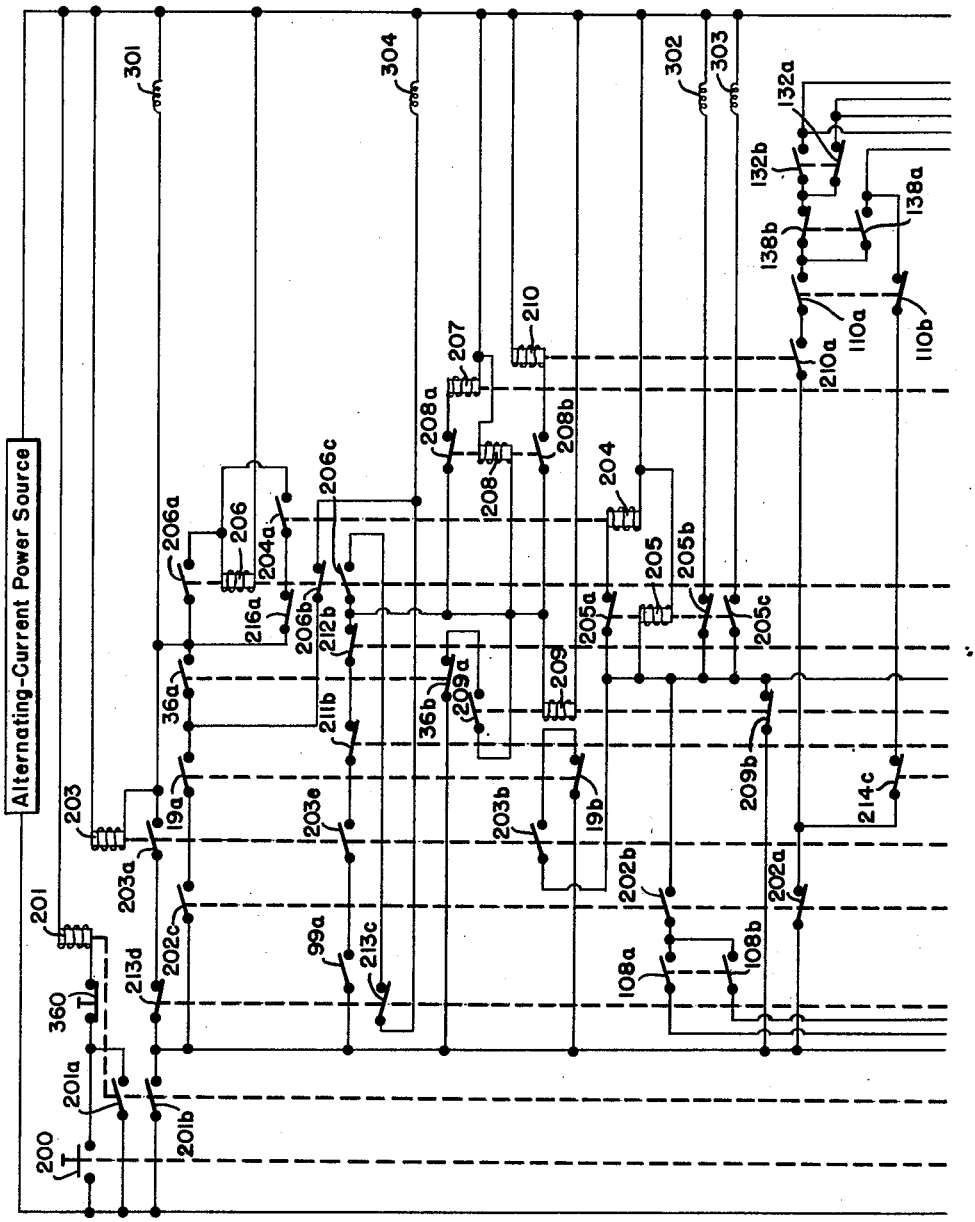
FIGS. 12 and 12a are circuit diagrams representing control circuits utilized in the FIG. 1 apparatus.
Figure 12A:
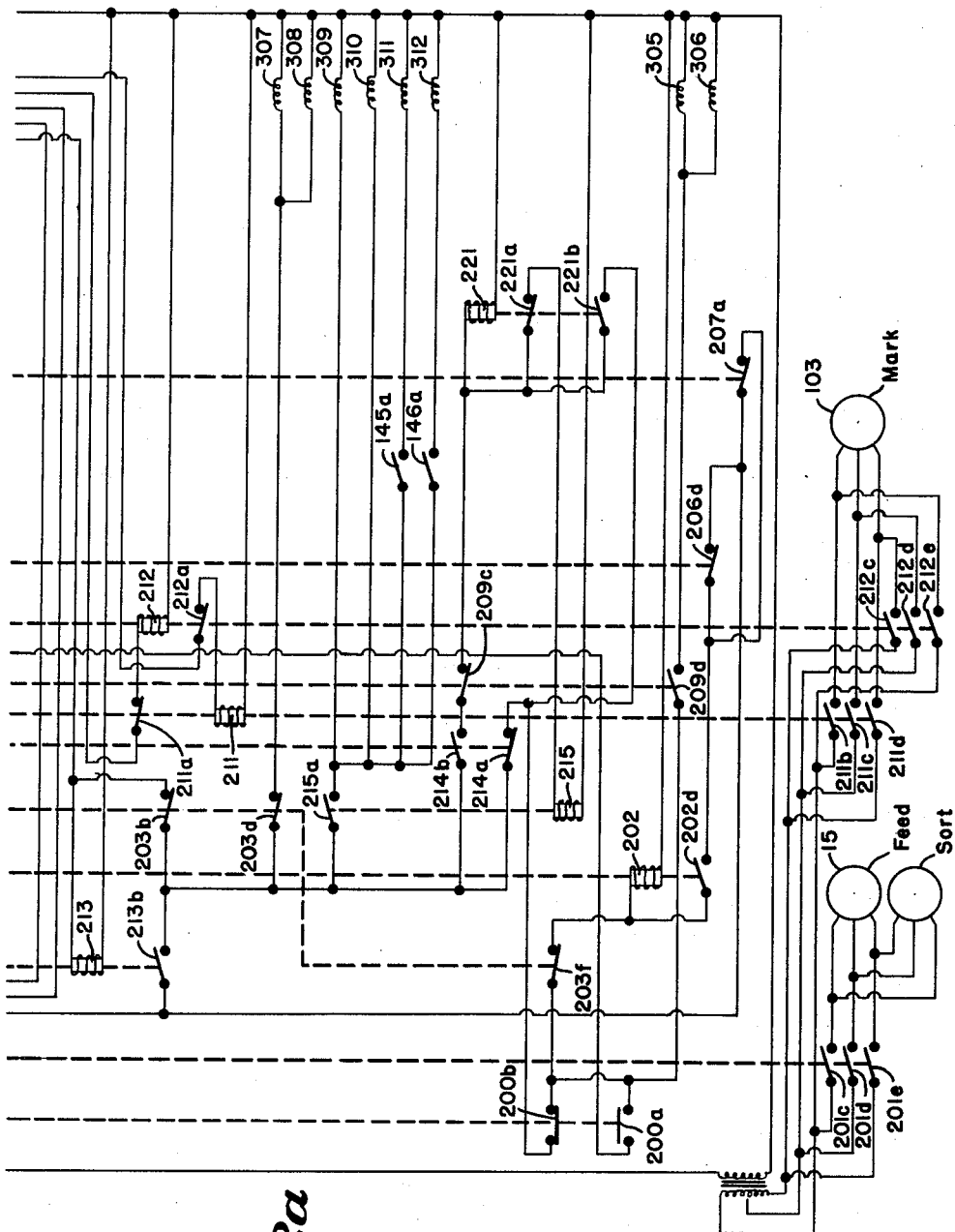

FIG. 12 and FIG. 12a are a circuit diagram representing the control circuits utilized in the FIG. 1 apparatus. Various relays of FIGS. 12 and 12a and their corresponding contacts are related in the diagram by corresponding reference numerals and by broken lines between the relay windings and the contacts. This circuit diagram can best be described during the explanation of the operation of the apparatus. FIG. 13 is a schematic diagram of the pneumatic system associated with the FIG. 1 apparatus and can best be described during an explanation of the operation of the apparatus.

Considering now the operation of the FIG. 1 apparatus, the table 37 is initially in the position represented in broken-line in FIG. 1. Limit switches 19, 99 and 108 (FIGS. 1 and 8) are in their unactuated conditions while limit switches 36 and 110 (FIGS. 1 and 8) are actuated initially. By an unactuated condition of the limit switch, it is meant that the limit switch has its associated contacts in the condition represented in FIG. 12 of the drawings, and by an actuated condition of the limit switch, it is meant that the limit switch has its associated contacts in the alternative condition to that represented in FIG. 12 due to a mechanical force acting against it. While initially considering the operation of the apparatus, a detailed reference to the circuit diagram of FIG. 12 will be deferred for the sake of clarity.

Figure 2:
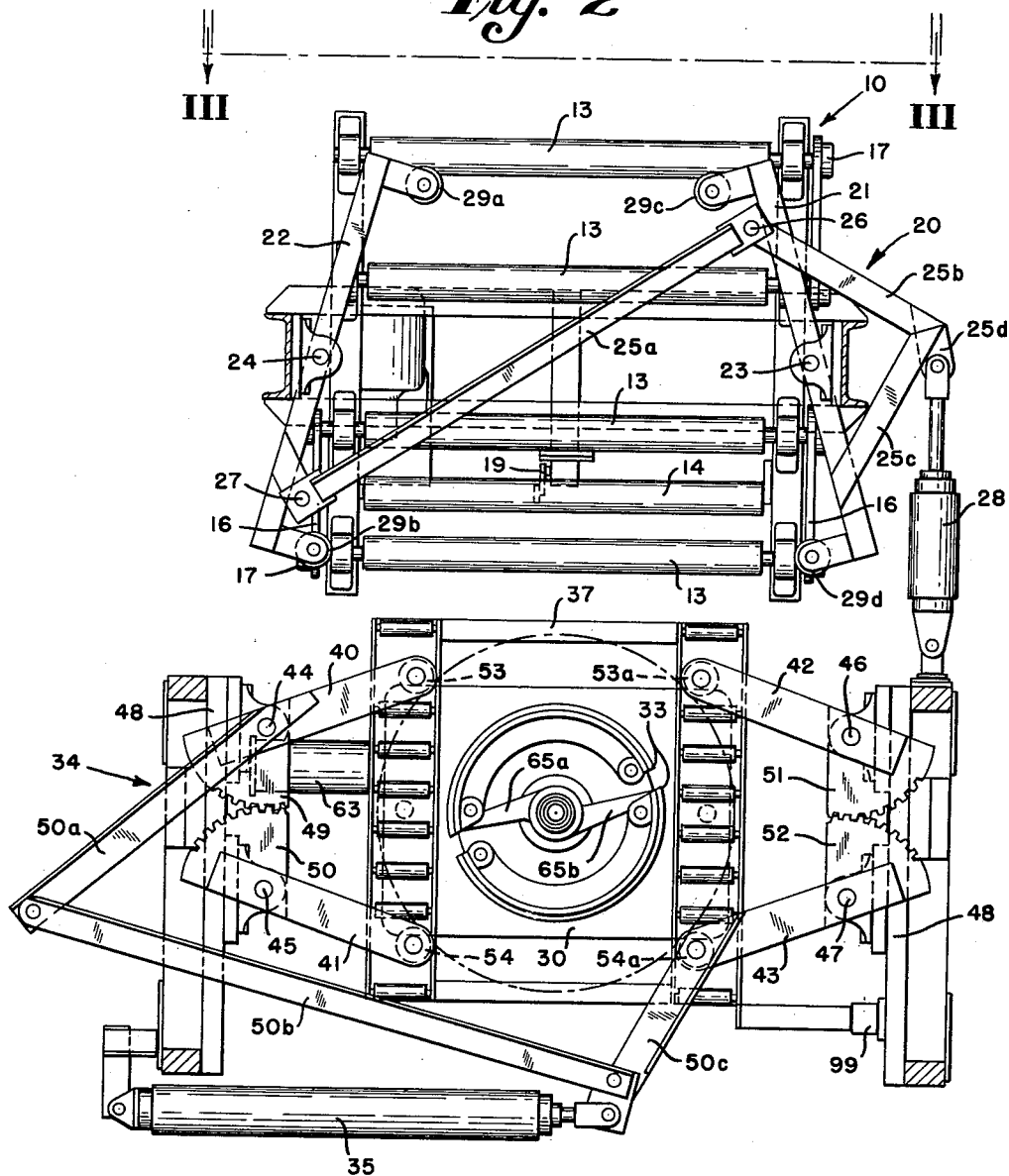
FIG. 2 is a fragmentary plan view, of the FIG. 1 apparatus taken along line II—II of FIG. 1.

Referring now to FIGS. 1 and 2, motor 15 drives rolls 13, 13 by means of belt and pulley 16, 17 to convey a tire into the apparatus from a conveyor line. As the tire depresses idler roll 14, it actuates limit switch 19. As will be explained more fully hereinafter, the actuation of limit switch 19 results in the actuation of cylinder 28, thereby pivoting arms 21 and 22 of the feeder mechanism to block the entrance to the feeder mechanism at rolls 29a and 29c and to widen the spacing between the rollers 29b and 29d, as represented in FIG. 2, to allow the tire to travel to the table 37.

Release of limit switch 19 results in the actuation of cylinder 35 which causes the arms 40, 41, 42, 43 to rotate on their pivots to the position represented in FIG. 2, closing the spacing between centering rolls 53, 54, 53a, 54a for centering a tire, represented in phantom, on the conveyor table 37. After a predetermined time interval, cylinder 35 returns to its unactuated condition, opening the rollers 53, 54, 53a, 54a on the tire.

After the tire is centered on the table 37, cylinder 98 operates to lower the table to position 37a. Referring to FIGS. 4 and 5, the cylinder 63 operates to open the chuck 33a, 33b while the sleeve 75 is engaging the balance table assembly 32 to hold it rigid during lowering and clamping of the tire 69. The chuck elements 33a, 33b are expanded by a yoke 79a of the spring loaded expanding mechanism 79b connected to arm 65b and actuated by projection 78b on the sleeve 80, as shown in FIG. 4. The sleeve 80 is rotated on sleeve 75 by projection 79 engaging pin 78 extending from the pinion gear 68 which is actuated by the rack 67 on the rod of cylinder 63. After the first movement of the pinion gear 68 has expanded the chuck elements 33a and 33b to the partially expanded position represented in FIG. 5, the rack 67 continues to rotate pinion gear 68 until the cams 77a and 77b act with the cam surface 76 to lower the sleeves 75 and 80 while the chuck elements are completely expanded. The balance table is disengaged from sleeve 75 and hangs freely on the balance wire 71.

The balance table 32a then assumes a condition of balance representative of the condition of balance of the tire. If the tire is properly balanced, the balance table remains horizontal and there is no displacement of the cores within the three differential transformers 81, 82, 83. However, if the tire is unbalanced, the balance table tilts in a manner representative of the condition of unbalance displacing the cores within the differential transformers. The secondary windings of the three transformers are connected as represented in FIG. 11 to develop an output signal having a phase uniquely representative of the position of any unbalance of the tire and having an amplitude representative of the magnitude of the unbalance. This may be demonstrated as follows.

Referring now to FIG. 5a, assume that the tire on the balance table is unbalanced due to a light region of the tire along axis X of FIG. 5a. Transformers 82, 81 and 83 are positioned with respect to reference axis R, which is normal to axis X as represented in FIG. 5a, as indicated by angles $\alpha$, $\beta$, $\gamma$, respectively, where:

$$\beta = \alpha + 120° \quad (1)$$
$$\gamma = \alpha + 240° \quad (2)$$

Also, voltages, $e_a$, $e_b$, $e_c$ applied to the primary windings of the transformers 82, 81, 83, respectively, may be expressed as follows:

$$e_a = K \sin \theta \quad (3)$$
$$e_b = K \sin (\theta + 120°) \quad (4)$$
$$e_c = K \sin (\theta + 240°) \quad (5)$$

where K is a constant.

Then the voltages $e_{82}$, $e_{81}$, $e_{83}$ developed across the secondary windings of transformers 82, 81, 83, respectively, may be expressed:

$$e_{82} = M \sin \alpha \sin \theta \quad (6)$$
$$e_{81} = M \sin \beta \sin (\theta + 120°) \quad (7)$$
$$e_{83} = M \sin \gamma \sin (\theta + 240°) \quad (8)$$

where M is a factor determined by the transformer parameters and by the mass of unbalance.

The combined output voltages from the three transformers may be expressed by the sum of Equations 6, 7, and 8:

$$e_s = e_{82} + e_{81} + e_{83}$$

Substituting Equations 6, 7, 8 and Equations 1 and 2 in Equation 9, Equation 9 may be rewritten:

$$e_s = M [\sin \alpha \sin \theta) + \sin (\alpha + 120°) \sin (\theta + 120°) + \sin (\alpha + 240°) \sin (\theta + 240°)] \quad (10)$$

By means of trigonometric identities, Equation 10 may be reduced to:

$$e_s = \frac{3}{2} M \sin (\theta + \alpha) \quad (11)$$

Thus, as represented by Equation 11, the phase of the combined output voltages $e_s$ is representative of the position of any unbalance while the amplitude of the signal $e_s$ represents the magnitude of the unbalance.

Referring now more patricularly to FIG. 11 of the drawings, the three-phase signal source 120 supplies to the primary windings of the differential transformers 82, 81, 83 signals which are displaced 120° in phase, as represented by Equations 3, 4 and 5. There is developed across the combination of the secondary windings a resultant signal having a phase uniquely representative of the position of any balance of the tire and having an amplitude representative of the magnitude of the unbalance, as represented by curve A of FIG. 11 and by Equation 11. The resultant signal represented by curve A is amplified by amplifiers 124, 125 and applied to amplifier-limiter 126 driving that amplifier-limiter to cut-off and saturation to derive an output signal represented by curve B.

The amplifier-limiter 126 applies the signal represented by curve B to differentiating circuit 127 which derives negative pulses represented by curve C and corresponding to the timing of the vertical negative-going edges of the output signal of curve B. The differentiating circuit 127 applies the pulses to the adder 128. Positive pulses corresponding to the positive-going vertical edges of curve B are prevented due to grid-current flow in the adder 128 which loads the differentiating circuit 127.

The three-phase signal source 120 also applies signals 120° displaced in phase to the stator windings 129a of synchro transmitter 129 having its rotor 129b attached to the marking apparatus. The output signal of the synchro transmitter, represented by curve D, is applied to amplifier-limiter 130 which operates in a manner similar to amplifier-limiter 126 to derive a rectangular-wave signal represented by curve E. The amplifier-limiter 130 applies the signal represented by curve E to adder 128 wherein it is combined with the pulses represented by curve C to derive an output signal represented by curve G. If an unbalanced tire has a light point within a 0° to 180° arc from a reference point, the pulses represented by curve C combine with the rectangular-wave signals represented by curve E in the manner represented in the drawing due to the position of the rotor 129b which controls the phase of the signal D relative to the signal A. The pulses are then effective to fire the Thyratron circuit 131 and energize the directional relay 132 to rotate the motor controlling the marking device in a predetermined forward direction, as will be explained more fully subsequently. However, if the tire has a light point within a 180° to 360° arc from the reference point, the pulses represented by curve C occur during the more negative region of the signal represented by curve E and are ineffective to overcome the bias of the Thyratron circuit. The Thyratron circuit, therefore, is not fired and the directional relay is not energized. This results in reverse operation of the motor which drives the marking apparatus in a reverse direction, as will be explained more fully subsequently.

The amplifier-limiter 130 also applies its output signal represented by curve E to differentiating circuit 135 wherein negative pulses represented by curve F and corresponding to the vertical negative-going edges of curve E are derived. These pulses are applied to the adder 136. Positive pulses corresponding to the positive-going vertical edges of curve E are prevented due to grid-current flow in the adder 136 which loads differentiating circuit 135. The differentiating circuit 127 also applies its output pulses to the adder 136. When the pulses represented by curve C and curve F occur in time coincidence, the output pulses of the adder 136 are effective to fire the Thyratron circuit 137, thereby energizing the coincidence relay 138 to indicate that the marking apparatus is properly positioned over the point of unbalance of the tire.

The amplifier 124 also applies its output signal to rectifiers 502 and 503 which derive a positive unidirectional signal having a magnitude representative of the amplitude of the output signal from the secondary windings of the differential transformers 81, 82, 83. The rectifiers 502 and 503 apply the unidirectional signal to amplifier 139 which, in turn, applies an amplified signal to unbalanced detectors 140, 141, 142, 143 which are biased to cause energization of one or more of relays 216, 146, 145, 214 depending on the amplitude of the signal applied to the detectors 140, 141, 142, 143 to actuate the marking apparatus to indicate the magnitude of the tire unbalance, as will be more fully explained hereinafter.

Figure 10:
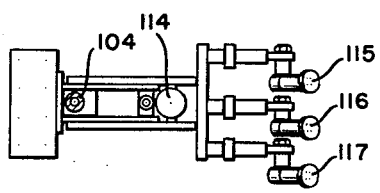
FIG. 10 is a fragmentary plan view of the FIG. 9 apparatus taken along line X—X of FIG. 9 to represent the marking cylinders.

Referring now more particularly to FIGS. 8, 9 and 10, under the control of the coincidence relay 138 and the directional relay 132, the motor 103 rotates the marking apparatus to position the marking instruments 115, 116, 117 directly over the point of unbalance. The motor 103 drives the marking apparatus by means of belt 105 and pulley 106. Disc 107 actuates limit switch 108 as the marking apparatus rotates. Pin 109 rotates cam 106, deactuating overtravel limit switch 110 if more than 190° of rotation occurs.

When the marking apparatus is positioned over the point of unbalance of the tire, one or more of the cylinders 115, 116, 117 is actuated, as will be explained subsequently, lowering its associated marking instrument to mark the tire with one, two or three marks representative of the magnitude of the unbalance when the tire is raised. After a suitable time interval, cylinder 63 (FIG. 4) returns to its unactuated condition, displacing rack 67 and rotating pinion gear 68 in the direction of collapse chuck 33a, 33b (FIG. 5) with a sequence of operations opposite to that described in the opening of the chuck. The cylinder 98 (FIG. 1) then raises the table 37 to the position represented in broken-line construction in FIG. 1 and the tire is marked. Thereafter, the cylinders 115, 116, 117 return to their unactuated condition. The next tire to be tested pushes the preceding tire into the sorter mechanism.

If the tire is found to be out of balance, the sorter mechanism 12 remains in the position represented in FIG. 1 and the tire is conveyed by a conveyor 501 to a position where corrective weight can be added by means of dough or the like. If the tire had been found acceptable, the cylinder 100 would have been actuated, raising the sorting mechanism 12 to the position represented in broken-line construction in FIG. 1 to convey the tire along a different conveyor 500 for acceptable tires.

The apparatus for automatically controlling the operations of the FIG. 1 apparatus will new be described in detail with reference to FIGS. 12 to 15. The solenoids of FIG. 13 are represented diagrammatically by plungers which are assumed to move away from the corresponding valves when the solenoids are energized. Some valves are actuated by two solenoids; each of the remaining valves is spring-loaded so that when the corresponding solenoid is deenergized, the valve automatically shifts to the position represented in the drawing.

Refer now more particularly to FIGS. 12 and 12a which are a detailed circuit diagram of the control circuits and to FIG. 14 which is a sequence diagram representing the sequence of operations of the machine assuming that the tire being tested is in balance. In the initial operating condition, limit switches 36 and 110 are actuated and their contacts assume positions differing from those represented in FIGS. 12 and 12a. The remaining limit switches are in their unactuated condition. When the start button 200, 200a, 200b is depressed, relay 201 is energized, closing contacts 201a, 201b, 201c, 201d and 201e. Contact 201a is a holding contact, maintaining the relay 201 energized after the start button is released. Contacts 201c, 201d, 201e cause the tire-feed motor 15 and sort conveyor motor 103a (FIG. 7) to be energized, driving the feed apparatus to convey a tire into the intake portion of the apparatus.

Relay 202 is then energized momentarily through contact 203f, start button 200a, relay contact 209b and contact 201b. Energization of relay 202 opens contact 202a and 202e (FIG. 11) and closes contacts 202b, 202c, 202d. Relay 202 remains energized through contacts 202d, 206d and 207a.

When the tire depresses idler roll 14 (FIG. 1) of the feed conveyor, limit switch 19 is actuated, closing contact 19a and opening contact 19b. Relay 203 is then energized through limit switch contact 36a, limit switch contact 19a, relay contact 202c and relay contact 201b. Energization of relay 203 closes contacts 203a, 203b, 203e and opens contacts 203c, 203d and 203f. Relay 203 then has an alternate path of energization through relay contact 203a, 213d and 201b. Solenoid 301 is then energized through the same relay contacts and limit switch contacts as relay 203.

When solenoid 301 is energized it actuates valve 401 (FIG. 13), shifting the valve and causing actuation of cylinder 28 which controls the feed gate arms 21, 22 (FIG. 1). Solenoid 304 is energized at the same time through relay contact 206b, limit switch contact 19a and relay contacts 202c and 201b. Energization of solenoid 304 shifts the valve 404 from the position represented in the drawing to its alternate position, thereby actuating cylinder 63 to open the chuck and suspending the balance table on the balance wire.

The purpose of this preliminary suspension of the balance table on the balance wire is to provide a preliminary check of the balance of the machine when no tire is on the balance table. If the machine is out of balance due, for example, to the presence of foreign matter on the balance table, the resultant signal A (FIG. 11) developed by the differential transformers causes the detectors 502 and 503 and amplifier 139 to apply to detector 140 a signal of sufficient magnitude to overcome the bias of detector 140. Detector 140 then develops an output potential effective to cause energization of relay 216. If relay 216 were energized, it would be impossible for relay 206 to become energized and further operation of the machine would be prevented.

As the tire passes off the feed conveyor rolls the limit switch 19 returns to its unactuated condition, thereby energizing relay 204 through relay contact 205a, contact 203b and limit switch contact 19b. Solenoid 302 is energized through relay contacts 205b, 203b and limit switch contact 19b when the limit switch returns to its unactuated condition. Solenoid 302 causes the solenoid valve 402 to shift from the position represented in the drawing, actuating cylinder 35 and closing the centering mechanism on a tire.

When the preliminary check of the balance of the apparatus indicates the apparatus is in balance and relay 216 remains in its deenergized condition, energization of relay 204 closes contact 204a, thereby energizing relay 206 through contacts 204a, 216a, 203a, 213d and 201b. Relay 206 has a holding contact 206a which then closes while contacts 206b, 206d and 206e (FIG. 11) open and contact 206c closes. When relay 206 is energized, solenoid 304 is deenergized due to the opening of contact 206b. Valve 404 then returns to the position represented in the drawing, deactuating cylinder 63 and closing the chuck. Also, relay 202 is deenergized due to the opening of contact 206d and returns its contacts to the positions represented in the drawing. After relay 206 is energized, time-delay relay 205 is energized through same path as relay 204, opening contacts 205a, 205b and closing contact 205c and causing relay 204 to return to its deenergized condition.

When relay 205 is energized, it deenergizes solenoid 302, causing the valve 402 to return to its unactuated condition and open the centering mechanism. It also deenergizes relay 204 as previously explained and causes solenoid 303 to be energized through relay contact 205c, 203b and limit switch contact 19b.

Energization of solenoid 303 shifts the solenoid valve 403 from the position represented in the drawing to actuate cylinder 98 and lower the table 37. Lowering the table places limit switch 36 in its unactuated condition and actuates limit switch 99. Actuation of limit switch 99 closes contact 99a and energizes relay 207 through contacts 208a, 212b, 211b, 203e, and 99a. Relay 207 when energized opens contact 207a. After a suitable time delay, time-delay relay 208 is energized through contacts 212b, 211b, 203e and 99a. Relay 208 when energized opens contact 208a and closes contact 208b, thereby deenergizing relay 207 and energizing relay 210.

When limit switch 99 is actuated, relay 209 is energized through contacts 212b, 211b, 203e and limit switch contact 99a. Energization of relay 209 opens relay contacts 209b and 209c and closes relay contacts 209a, 209d and 209e (FIG. 11).

Actuation of limit switch 99 also causes solenoid 304 to be energized through contacts 213c, 206c, 212b, 211b, 203e and 99a. Energization of solenoid 304 causes valve 404 to shift from the position represented in the drawing, thereby actuating cylinder 63 and opening the chuck 33a, 33b.

When relay 210 is energized relay contact 210a closes. Contacts 210b and 210d (FIG. 11) also close. When the tire tested is balanced, the signal A of FIG. 11 has zero amplitude and the amplifier 139, therefore, does not derive an output signal effective to cause current flow through any of detectors 143, 142, 141 sufficient to energize any of relays 214, 145, 146. If the tire were unbalanced, either motor-reversing relay 212 or motor-forwarding relay 211 would then be energized depending on which of the contacts of the directional relay 132 (FIG. 11) is closed. When the tire is balanced, motor-reversing relay 212 may be energized through contact 211a, contact 132a of directional relay 132 (FIG. 11), contact 138b of coincidence relay 138 (FIG. 11), contact 110a of limit switch 110 which is actuated, contact 210a and through contact 202a which is closed at this time. When motor-reversing relay 212 is energized, contact 212a opens disabling motor-forwarding relay 211. Relays 211 and 212 have their associated contacts 211b, 211c, 211d and 212c, 212d, 212e in the power-supply circuit for the marking motor 103 and at this time drive the marking apparatus.

When the marking apparatus rotates, limit switch 108 is actuated, closing either contact 108a or 108b depending on the direction of rotation of the marking apparatus. Also, when the marking apparatus rotates more than 190° from its reference position, limit switch 110 returns to its unactuated condition, opening contacts 110a and closing contact 110b and thereby deenergizing relay 212 to stop the rotating apparatus and relays.

When limit switch contact 110b closes, relay 213 is energized through limit switch contact 110b, relay contact 214c and contact 202a. Energization of relay 213 opens contact 213c and closes contact 213b.

When contact 213b closes, relay 202 is again energized through the stop button 360a, relay contact 214a, contact 213b and contact 201b. Also, solenoids 305 and 306 are energized through contact 209d, start button contact 200b and relay contacts 214a, 213b and 201b. Energization of solenoid 305 actuates valve 405 and causes cylinder 114 to operate, to mark an acceptable tire to indicate the tire has been checked. Through the proper interlocking of the first unbalance level relay 214 contacts with relays 211 and 212, which are the relays controlling the motor 103 for rotating the marking devices, rotation of the markers and marking of acceptable tires can be eliminated, in which case marking device 114 can also be eliminated. Energization of solenoid 306 actuates valve 406, causing cylinder 100 to shift from the condition represented in the drawing, thereby raising the sorter 12 conveyor to convey an acceptable tire.

Also, when relay 213 is energized, relays 203 and 206 are deenergized due to the opening of contact 213d. Likewise, solenoids 301 and 304 are deenergized due to the opening of contacts 213d and 213c, respectively. Deenergization of solenoid 304 results in a return to its original position of solenoid valve 404, causing cylinder 63 to reverse its operation and close the chuck.

When relay 203 is deenergized, relay contacts 203a, 203e and 203b open and relay contacts 203c and 203d close. Solenoid 303 is then deenergized and solenoid 308 is energized through contacts 203d, 213b and 201b, shifting the position of solenoid valve 403 to that shown in the drawing to actuate cylinder 98 and to raise the conveyor table. Marking occurs when the conveyor table rises. At this time solenoid 307 is energized through contacts 203d, 213b, and 201b, shifting the solenoid valve 401 to the position shown in the drawing to deactuate cylinder 28 and thereby open the feeder mechanism to the next tire. Also, when relay 203 is deenergized, relay 205 is deenergized due to the opening of contact 203b.

When the conveyor table is raised, limit switch 99 returns to its unactuated condition and limit switch 36 is actuated. Likewise, limit switch 19 is actuated when the next tire passes into the feeder section of the apparatus. The tire tested is then pushed by the next tire onto the sorter mechanism 12.

When limit switches 19 and 36 are actuated, solenoids 301 and 304 are energized along the same paths as during their previous energizations. When solenoid 304 is energized, valve 404 again shifts from the position represented in the drawings and the chuck opens. Also, relay 203 is again energized, causing the deenergization of solenoid 307, relay 213, and solenoid 308. When solenoid 307 is deenergized, solenoid valve 401 shifts, closing the feeder mechanism. When solenoid 308 is deenergized, solenoid valve 403 is conditioned to shift position upon the next energization of solenoid 303 to lower the conveyor table.

When limit switch 36 is actuated, contact 36b opens, deenergizing relay 209 and causing contact 209a to open, 209b to close, 209c to close, 209d to open. Relays 210, 208 and solenoids 305 and 306 are then deenergized. Deenergization of solenoid 305 causes the marking apparatus to rise if an acceptable tire had been marked. Deenergization of solenoid 306 conditions the sorter mechanism to return to the reject position. Also, one of relays 211 and 212 is energized through contacts 211a or 212a, 108a or 108b, 202b and 209b to rotate the marking apparatus to return limit switches 108 and 110 to their original conditions and to position the marking apparatus at its reference position as determined by the slot in disc 107 (FIG. 8). The marking apparatus rotates until limit switch 108 opens contacts 108a and 108b when disc 107 is in its reference position represented in FIG. 8.

Figure 15:
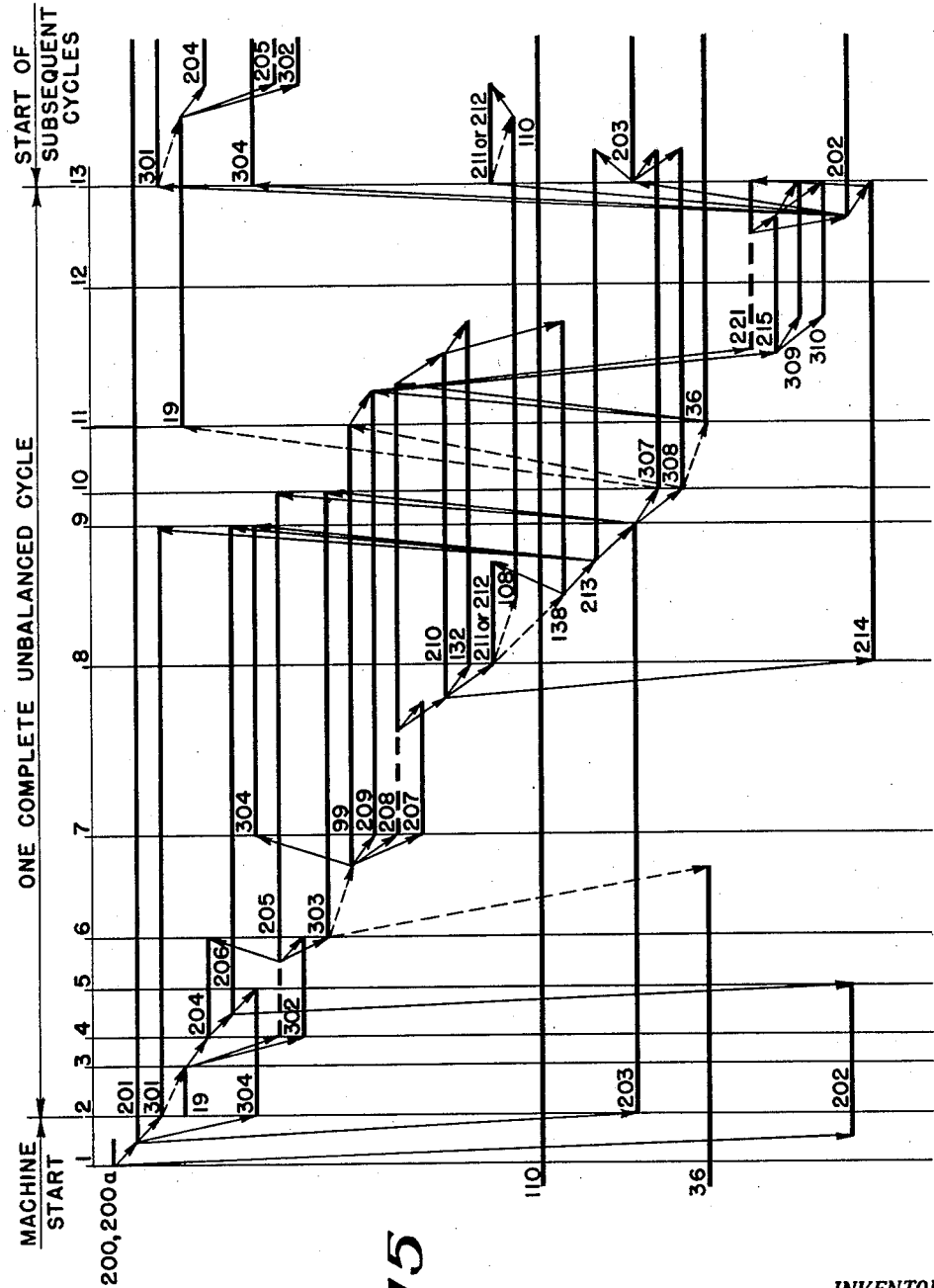
FIG. 15 is a diagram representing the sequence of operation of the FIG. 1 apparatus when a tested tire is out of balance.

Consider now the operation of the apparatus with reference to FIG. 15 representing the sequence of operations when the tire undergoing test is out of balance. The sequence of operations prior to sequence 8 at the time when relay 210 is energized is the same as the sequence of operations represented by FIG. 14 and previously described. Accordingly, the explanation of the operation when the tire undergoing test is out of balance will be commenced with the energization of relay 210 just prior to sequence 8.

When relay 210 is energized, relay contacts 210a, 210b, (FIG. 11) and 210d (FIG. 11) close. When relay contact 210b closes (FIG. 11), the directional and coincidence relays 132 and 138 are conditioned for energization in accordance with the signals supplied to the Thyratron circuits 131 and 137 as previously explained. Assuming that the phases of the signals supplied to the Thyratron circuit 131 are such as to energize directional relay 132, contact 132a opens and contact 132b closes, causing energization of relay 211 through contacts 212a, 132b, 138b, 110a, 210a and 202a. The marking motor then rotates the marking apparatus in the shorter (for example, forward) direction to the point of unbalance under the control of the directional relay 132. When the marking apparatus rotates, limit switch 108 is actuated. Contacts 108a or 108b then close. Also, when the marking apparatus is rotated to the point of unbalance under the control of the Thyratron circuit 137 of FIG. 11, the coincidence relay 138 is energized, opening contact 138b and closing contact 138a, and stopping the motor-forwarding action by deenergizing relay 211. If the relative phases of signals A and D of FIG. 11 were such that the Thyratron circuit 131 did not fire, relay 212 would have been energized through contact 132a and the marking apparatus would have rotated in the reverse direction to the point of unbalance.

Commencing with sequence 7, when relay 209 is energized closing relay contact 209e (FIG. 11), relays 214, 145 and 146 are in condition for energization in accordance with the amplitude of the signal A (FIG. 11) representing the unbalance of the tire. Assuming that the amplitude of signal A is sufficiently large due to unbalance of the tire to cause rectifiers 502 and 503 and amplifier 139 to derive a D.C. signal which adds to the bias of detector 143 to drive the first stage of the detector to cut off, the output signal level of detector 143 changes from its maximum negative value to its maximum positive value, causing current flow through relay 214 and rectifier 510 to energize relay 214. Detectors 142 and 141 are biased at less negative values than detector 143 and, therefore, relays 145 and 146 do not become energized unless the amplitude of signal A increases, representing a greater magnitude of unbalance. Thus, either relay 214 or relays 214 and 145 or relays 214, 145 and 146 are energized, depending on the magnitude of unbalance.

When the relay 214 is energized, relay contact 214d (FIG. 11) closes and when the coincidence relay 138 is energized relay contact 138c closes, connecting the primary winding of transformer 515 to the source 120. The transformer 515 then applies a signal through rectifier 512 to relay 214, to maintain that relay energized while the marking apparatus is over the point of unbalance. Similarly, if relays 145 and 146 were also energized, relay contacts 145d and 146d (FIG. 11) would have been energized and the transformer 515 would apply the signal through those relay contacts to maintain the relays 145 and 146 energized while the marking apparatus is over the point of unbalance.

Since the coincidence relay 138 has a contact 138c in the holding circuit, none of the relays 214, 145 and 146 are maintained energized by the holding circuit prior to energization of coincidence relay 138 if the balance table rocks temporarily beyond the position corresponding to the unbalance of the tire while seeking that position. By the time that the coincidence relay 138 is energized, the balance table has assumed its stationary position of unbalance corresponding to the unbalance of the tire and an accurate marking of the tire is, therefore, assured. Also, the use of regenerative D.C. amplifiers 141, 142 and 143 assures that the apparatus is sensitive to variations of the amplitude of signal A and that relays 214, 145 and 146 are accurately controlled during energization and deenergization.

When the coincidence relay 138 is energized, relay 213 is energized through contact 138a, limit switch contact 110a, and relay contacts 210a, 202a and 201b. Energization of relay 213 closes contact 213b, and opens contact 213c and 213d. Relay 206 and solenoid 301 are then deenergized due to the opening of contact 213d. Solenoid 304 is deenergized due to the opening of contact 213c, and valve 404 shifts to the position represented in the drawing to deactuate cylinder 63 and close the chuck. Relay 203 is deenergized upon the energization of relay 213 and opens contacts 203a, 203b, 203e and closes contacts 203c, 203d. Relay 205 and solenoid 303 are deenergized upon deenergization of relay 203. Solenoids 307 and 308 are then energized through contacts 203d, 213b and 201b, resulting in the opening of the feed gate mechanism to the next tire and the raising of the conveyor table, respectively.

As the next tire passes over limit switch 19, it actuates that switch. When the conveyor table is raised limit switch 99 returns to its unactuated condition while limit switch 36 is actuated. When limit switch 36 is actuated, relay 209 is deenergized due to the opening of limit switch contact 36b. Relay contacts 209a and 209d then open while contacts 209b and 209c close. When limit switch contact 36b opens, relay 208 is also deenergized, closing contact 208a and opening contact 208b.

When relay 208 is deenergized, relay 210 is deenergized due to the opening of contact 208b. Relay contact 210a then opens. Contacts 210b and 210d (FIG. 11) also open. At this time the coincidence relay 138b and the directional relay 132 are deenergized due to the opening of contact 210b which extinguishes the Thyratron circuits represented in FIG. 11.

When relay 209 is deenergized, closing contact 209c, relay 215 is energized through contacts 221a, 209c, 214b, 213b and 201b. Energization of relay 215 closes contact 215a, energizing solenoids 309 and 310. When solenoid 309 is energized, valve 406 assumes the position represented in the drawing, causing cylinder 100 to maintain the sorter mechanism 12 in reject position. When solenoid 310 is energized, the marking cylinder 115 is actuated, making a mark on the tire at the point of unbalance.

If the unbalance had been greater, relay contacts 145a or both sets of relay contacts 145a and 146a in series with solenoids 311 and 312 would also be closed due to the additional energization of relay 145 or both relays 145 and 146 if the amplitude of signal A (FIG. 11) were sufficient. Accordingly, additional marks would be made at the point of unbalance by the marking instruments controlled by solenoids 311 and 312 and in accordance with the magnitude of the unbalance. For example, one mark may represent an unbalance of less than 30 ozs., two marks may represent an unbalance of 30–40 ozs., while three marks may represent an unbalance greater than 40 ozs.

Also, when relay 209 is deenergized, time-delay relay 221 is energized and after a suitable time delay opens contact 221a and closes contact 221b. When contact 221a opens relay 215 is deenergized, opening contact 215a and deenergizing solenoids 309 and 310. When solenoid 310 is deenergized, the cylinder 115 ceases marking the tire.

When contact 221b closes, relay 202 is energized through start button contact 200b, and relay contacts 221b, 209c, 214b, 213b and 201b. Energization of relay 202 opens contacts 202a and 202e (FIG. 11) and 202f (FIG. 11) and closes contacts 202b, 202c, 202d. When contact 202f opens, relay 214 is deenergized, opening contact 214b and closing contacts 214a and 214c. Contact 221b opens before contacts 214a close due to the finite intervals of time involved in closing contacts and relay 221 is therefore deenergized. When relay 202 is energized, solenoid 301 is then energized through limit switch contacts 36a, 19a and relay contacts 202c and 201b, closing the feeder mechanism 10 (FIG. 1) to the next tire. Solenoid 304 is energized through relay contact 206b, limit switch contact 19a, and relay contacts 202c and 201b. The motor-forwarding relay 211 or the motor-reversing relay 212 is also energized in the manner previously described to rotate the marking apparatus to its reference position. Relay 203 is energized through limit switch contacts 36a and 19a and relay contacts 202c and 201b. Energization of relay 203 deenergizes relay 213 due to the opening of contact 203c. Solenoids 307 and 308 are deenergized by the opening of contact 203d. Deenergization of solenoid 307 opens the feeder mechanism to the next tire. The condition of the solenoids is then the same as previously described and the apparatus is conditioned for testing the balance of the next tire.

From the foregoing description it will be apparent that apparatus constructed in accordance with the invention for automatically indicating the condition of balance of an object has several advantages. The indication of the condition of balance is automatically made and both the position of unbalance and its magnitude are accurately indicated on the tire. The apparatus is not susceptible to error due to tilting of the balance table before it assumes a rest position during the balancing operation. Also, the apparatus includes a self-checking feature.

While there has been described what is at present believed to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

Having thus described our invention, what we claim and desire to protect by Letters Patent is:

1. Apparatus for automatically indicating the condition of balance of an object comprising: normally balanced means for supporting an object thereon and capable of assuming a stationary position of unbalance representative of any unbalance of the object; electromechanical means attached to said supporting means at spaced points thereof corresponding to different regions of the object for individually developing signals representative of the displacement of said supporting means at said spaced points in response to any unbalance of the object; means for combining said signals to develop a resultant signal having a phase uniquely representative of the point of any unbalance of the object and having an amplitude representative of the magnitude of the unbalance; means displaceable to the point of unbalance in response to the phase of said resultant signal for marking said point of unbalance in accordance with the amplitude of said resultant signal to indicate the magnitude of the unbalance; and signal detector means coupled to said signal-combining means and responsive to any signal developed thereby prior to supporting an object on said normally balanced means for developing a signal to disable the apparatus if said normally balanced means is unbalanced prior to supporting an object thereon.

2. Apparatus for automatically indicating the condition of balance of an object comprising: normally balanced means for supporting an object thereon and capable of assuming a stationary position of unbalance representative of any unbalance of the object; control means for causing said normally balanced means to be tested for balance prior to supporting an object thereon and to disable the apparatus if said normally balanced means is unbalanced; electromechanical means attached to said supporting means at spaced points thereof corresponding to different regions of the object for individually developing signals representative of the displacement of said supporting means at said spaced points in response to any unbalance of the object; means for combining said signals to develop a resultant signal having a phase uniquely representative of the point of any unbalance of the object and having an amplitude representative of the magnitude of the unbalance; means displaceable to the point of unbalance in response to the phase of said resultant signal for marking said point of unbalance in accordance with the amplitude of said resultant signal to indicate the magnitude of the unbalance; and signal-detector means coupled to said signal-combining means and responsive to any signal developed thereby prior to supporting an object on said normally balanced means for disabling said marking means prior to displacement of said marking means to the point of unbalance.

References Cited in the file of this patent

UNITED STATES PATENTS

| | | |
|---|---|---|
| 2,155,528 | Cadden | Apr. 25, 1939 |
| 2,481,125 | Lannen | Sept. 6, 1949 |
| 2,506,002 | Tinkham | May 2, 1950 |
| 2,792,725 | Lannen | May 21, 1957 |
| 2,821,858 | King | Feb. 4, 1958 |
| 2,898,764 | Kinsey et al. | Aug. 11, 1959 |

FOREIGN PATENTS

| | | |
|---|---|---|
| 781,106 | Great Britain | Aug. 14, 1957 |
| 790,513 | Great Britain | Feb. 12, 1958 |